United States Patent [19]

Barber et al.

[11] 4,307,295

[45] Dec. 22, 1981

[54] MASS SPECTROMETERS

[75] Inventors: Michael Barber; Robert D. Sedgwick; Lester C. E. Taylor, all of Manchester, England

[73] Assignee: University of Manchester Institute of Science & Technology, Manchester, England

[21] Appl. No.: 128,161

[22] Filed: Mar. 7, 1980

[30] Foreign Application Priority Data

Mar. 15, 1979 [GB] United Kingdom ............... 09101/79

[51] Int. Cl.³ .............................................. B01D 59/44

[52] U.S. Cl. ...................................... 250/296; 250/281

[58] Field of Search ................ 250/281, 294, 296, 298

[56] References Cited

U.S. PATENT DOCUMENTS 2,851,608 9/1958 Robinson ............................ 250/296
3,061,720 10/1962 Ewald ................................. 250/296
3,920,988 11/1975 Taya et al. .......................... 250/296

*Primary Examiner*—Bruce C. Anderson
*Attorney, Agent, or Firm*—Kenyon & Kenyon

[57] ABSTRACT

In improved mass spectrometers of the double focussing zero second-order aberration type with first-order spectrograph properties, parameters are related by specific equations as a result of which the five aberration coefficients $B_1$, $B_2$, $B_{11}$, $B_{12}$ and $B_{22}$ can all be simultaneously zero.

10 Claims, 7 Drawing Figures

MASS SPECTROMETERS

Figure 1:
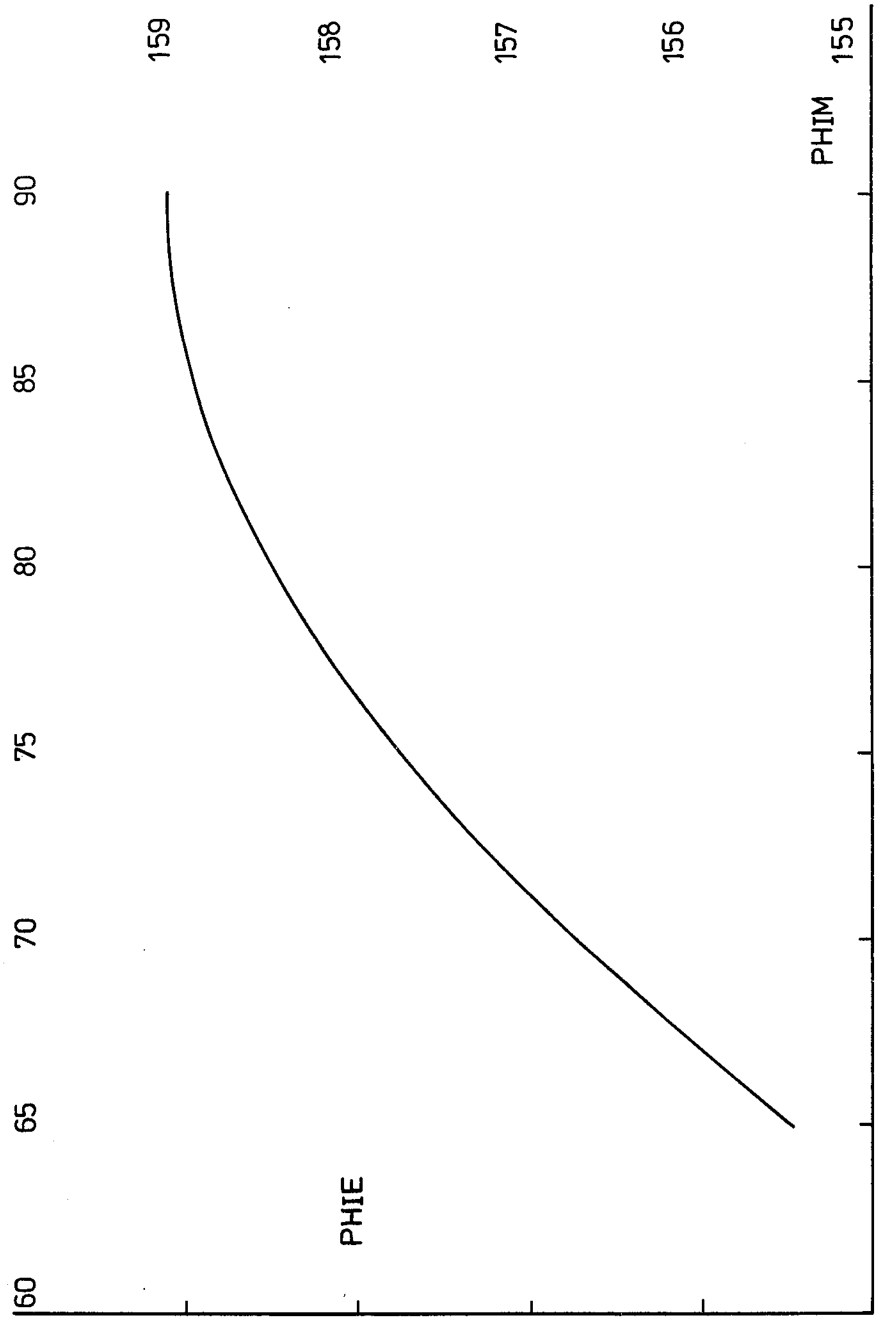

This invention relates to improved mass spectrometers, in particular to double focussing zero second-order aberration spectrometers with first-order spectrograph properties.

Double focussing instruments consisting of electric and magnetic fields in tandem were devised in the 1930's to provide the high resolution needed for accurate atomic-mass determinations. In later years the problems of improving focussing by eliminating second-order aberrations were studied and designs were produced in which, for correction of second order aberrations, the coefficients $B_{11}$, $B_{12}$ and $B_{22}$ could be reduced by numerical computational methods. We have now developed designs of spectrometers in which these coefficients can be eliminated by analytical solutions of the focussing equations so making possible an improved degree of resolution.

The spectrometers of this invention comprise an electrostatic analyser and a magnet producing a radial electrostatic field and a homogeneous magnetic field respectively, so arranged in tandem that an ion optical beam passing through them is normal to the entry and exit boundaries of the electrostatic field and to the inner face of the magnetic field adjacent to the analyser, but non-normal to the outer face of the magnetic field, the deflection of the ion-optical beam in the electrostatic and magnetic fields being in the same sense, the parameters $1'_e/R_e$, $\phi_e$, $R_e/R_m$, $d/R_m$, $\epsilon'$, $R_m/R'$, $\phi_m$, $\epsilon''$ and $1''_m/R_m$ having the values in the following ranges:

$\phi_m$: 64.2619° to 90.000°

$\epsilon'$: zero $\phi_e$: 155.2559° to 159.0990°

$\epsilon''$: −57.8691° to −45.0000°

$1'_e/R_e$: 0.8558 to 0.7071

$1''_m/R_m$: 0.2727 to 0.0000

$R_e/R_m$: $+\infty$ to 3.6336

$d/R_m$: $4.7930\times10^5$ to 0.8348

$R_m/R'$: −1.2222 to 0.7854 wherein the above symbols have the following meanings:

$1'_e$—the distance from the ion source to the entrance to the electrostatic field when the beam passes first through the electrostatic field, or the corresponding distance from the exit of the electrostatic field to the aberration-free focal point when the beam passes first through the electromagnet;

$R_e$—the radius of curvature of the mean beam axis in the electrostatic field;

$R_m$—the radius of curvature of the mean beam axis in the magnetic field;

$\phi_e$—the angle of deflection of the beam in the electrostatic field;

$\phi_m$—the angle of deflection of the beam in the magnetic field;

d—the distance separating the electrostatic and magnetic fields along the path of the beam;

$\epsilon'$—the angle of the beam to the normal to the inner face of the magnetic field, i.e. zero;

$\epsilon''$—the angle of the beam to the normal to the outer face of the magnetic field;

R'—the radius of curvature of the inner face of the magnetic field, and $1''_m$—the distance from the outer face of the magnetic field to the aberration-free focal point when the beam passes first through the electrostatic analyser, or the corresponding distance from the ion source to the outer face of the magnetic field when the beam passes first through the electromagnet, and the above parameters are related by the following equations numbered (1) to (7):

EQUATION 1.

$$-\sin\phi_m = \sqrt{2}\,\sin\left(\sqrt{2}\,\phi_e\right)$$

EQUATION 2.

$$\epsilon'' = \frac{\phi_m}{2} - \frac{\pi}{2}$$

EQUATION 3.

$$\frac{1'_e}{R_e} = (\cot^2\phi_m + \tfrac{1}{2})^{\frac{1}{2}}$$

EQUATION 4.

$$\frac{1''_m}{R_m} = \sin\phi_m - \tan\left(\frac{\phi_m}{2}\right)$$

EQUATION 5.

$$\frac{R_e}{R_m} = \left[\frac{2\sin^4\left(\frac{\phi_m}{2}\right)\left[16(1-\tfrac{1}{2}\sin^2\phi_m)^{\frac{1}{2}} + 99\sin^2\phi_m - 8(1-\tfrac{1}{2}\sin^2\phi_m)^{\frac{1}{2}}\sin^2\phi_m - 9\sin^4\phi_m + 142\right]}{9\left[3\cos^2\phi_m - 2\sin^2\left(\frac{\phi_m}{2}\right)\right]^2}\right]^{\frac{1}{2}}$$

EQUATION 6

$$\frac{d}{R_m} = \frac{\frac{R_e}{R_m}\sin^2\left(\frac{\phi_m}{2}\right)\left[24(1-\tfrac{1}{2}\sin^2\phi_m)^{\frac{1}{2}} + 10\sin^2\phi_m + 6\right] + 3\left(\frac{R_e}{R_m}\right)^2\left[(1-\tfrac{1}{2}\sin^2\phi_m)^{\frac{1}{2}} + 1\right]\left[3\cos^2\phi_m - 2\sin^2\left(\frac{\phi_m}{2}\right)\right]}{\sin\phi_m\left[3\frac{R_e}{R_m}\left(3\cos^2\phi_m - 2\sin^2\left(\frac{\phi_m}{2}\right)\right) - 8\left(1 - 2(1-\tfrac{1}{2}\sin^2\phi_m)^{\frac{1}{2}}\right)\sin^2\left(\frac{\phi_m}{2}\right)\right]}$$

EQUATION 7

$$\frac{R_m}{R'} = \frac{\sin\phi_m(\sin^2\phi_m - 18)}{6\left(\frac{R_e}{R_m}\right)^2} + 2\left[2 - \cot^2\left(\frac{\phi_m}{2}\right)\right]\cos^2\left(\frac{\phi_m}{2}\right)\cot\left(\frac{\phi_m}{2}\right)$$

Possible values of $\phi_m$ lie in the range 64.2619° to 90.000°; all other parameters have dependant unique values determined by the above equations. The dependant value of these other parameters determined by the values of $\phi_m$ in the above range are shown in FIGS. 1–7 of the accompanying drawings in which:

FIG. 1 shows dependence of $\phi_e$

Figure 2:
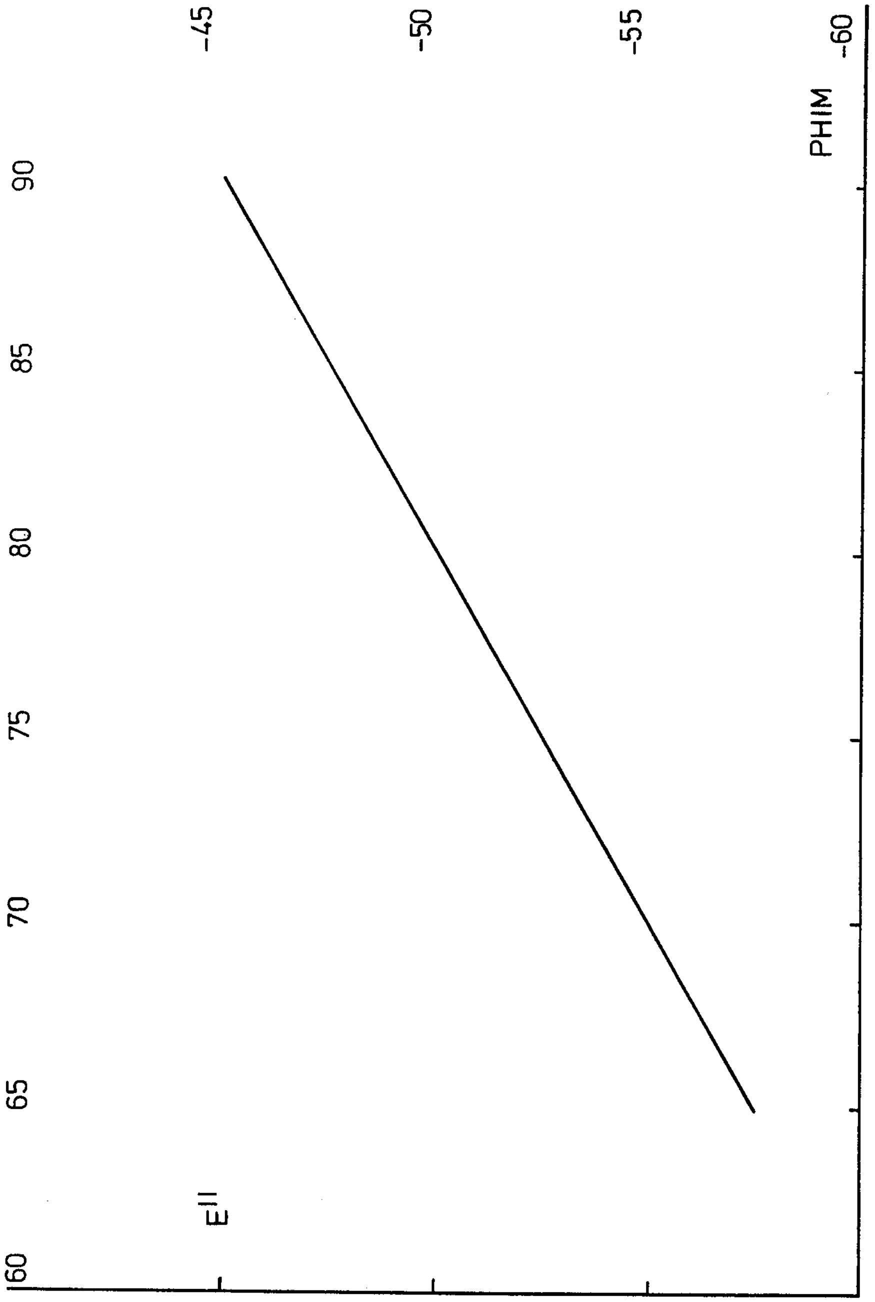
Figure 3:
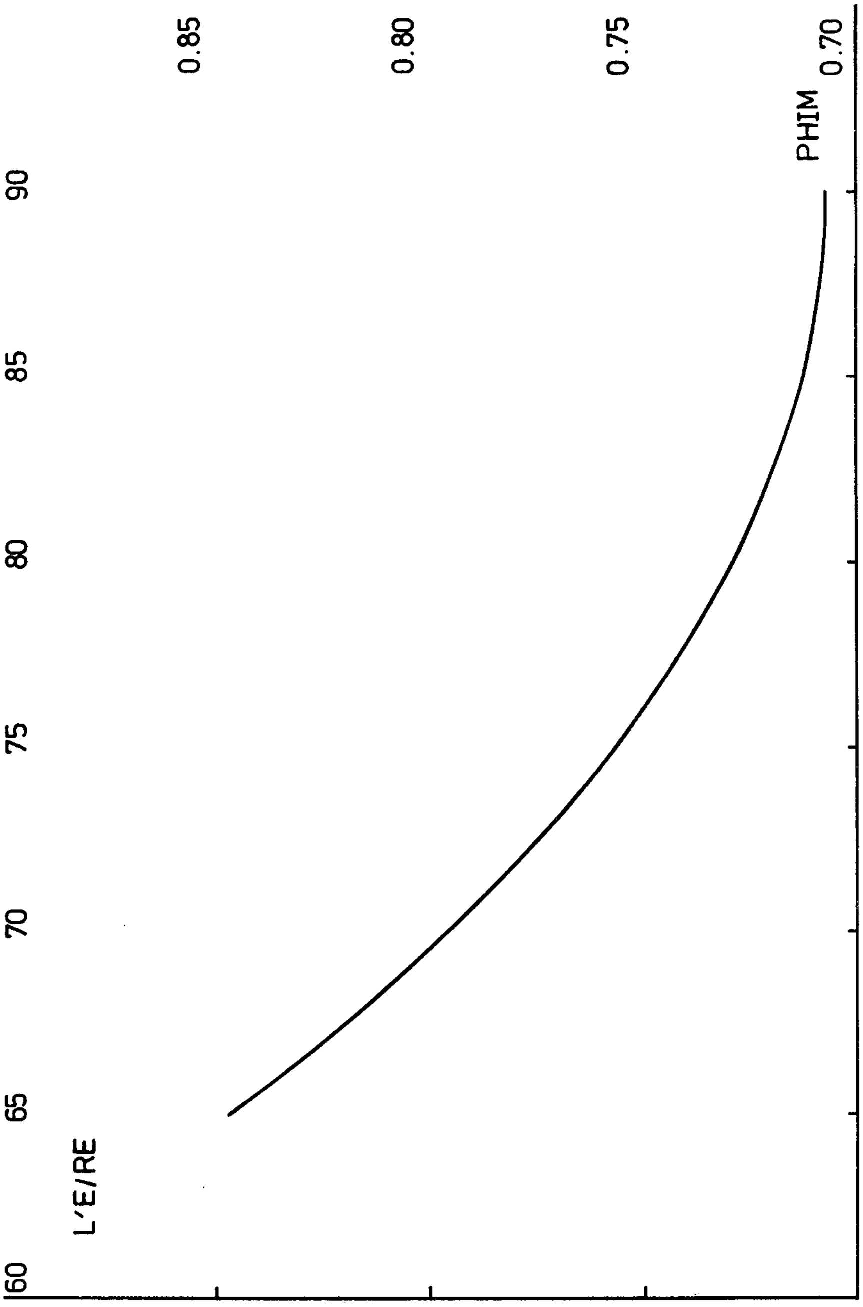
Figure 4:
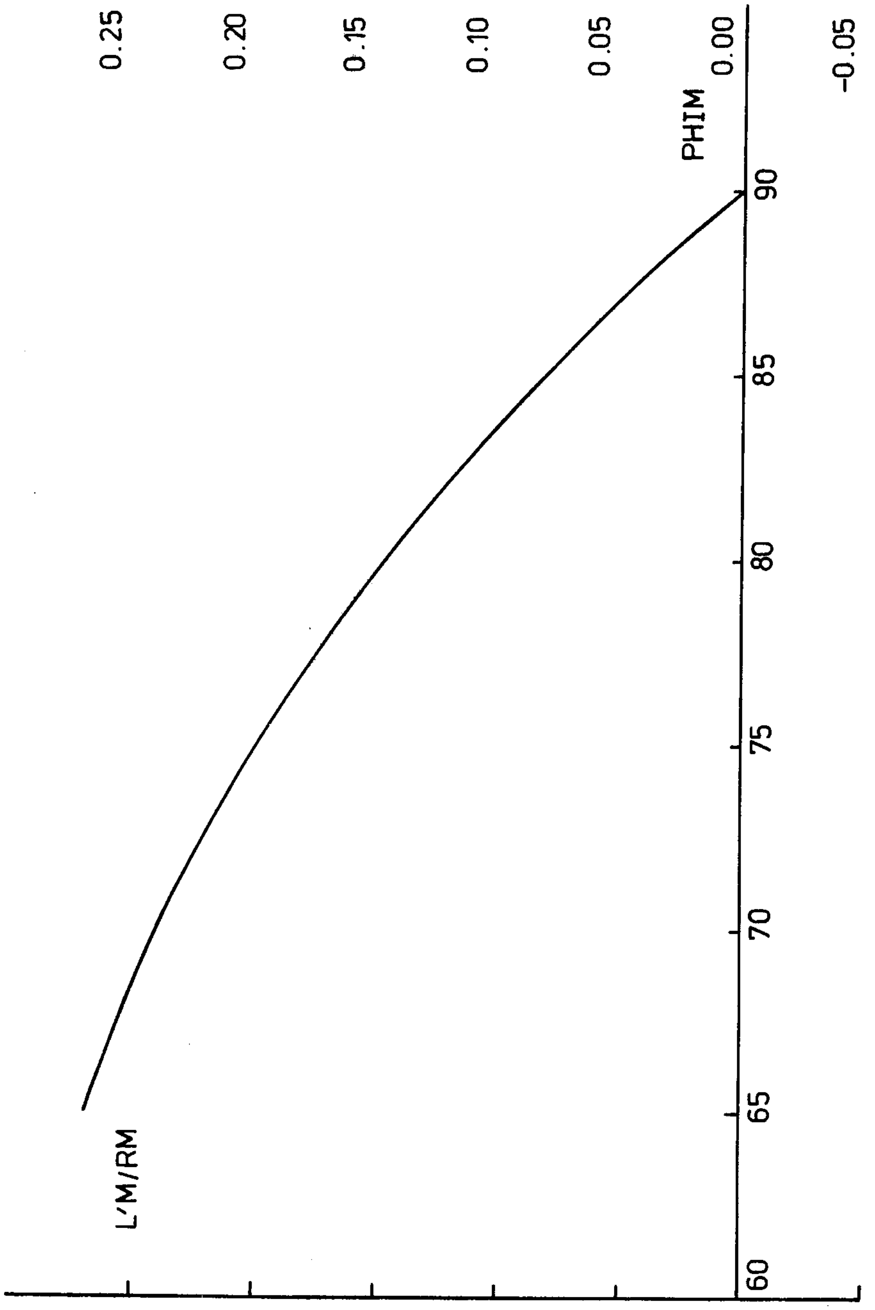
Figure 5:
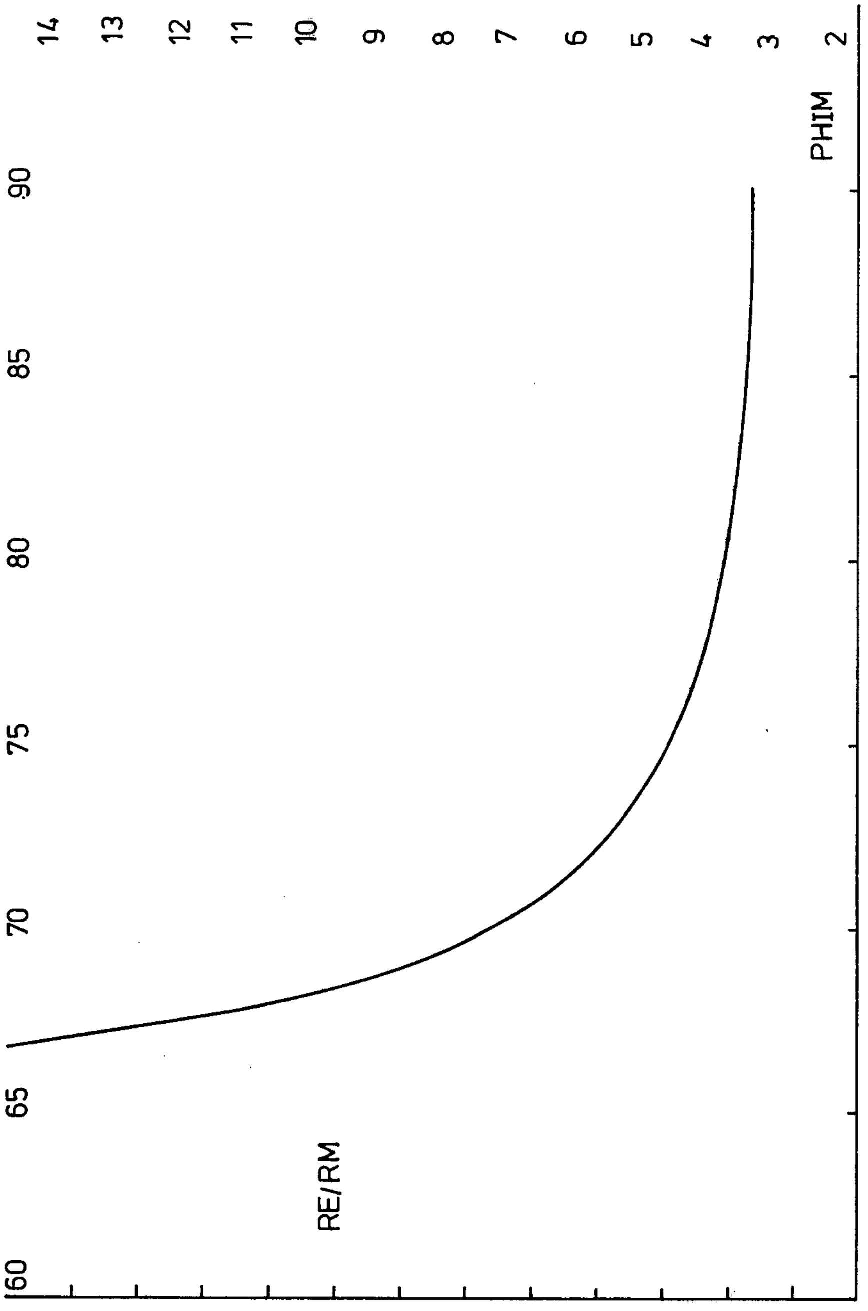
Figure 6:
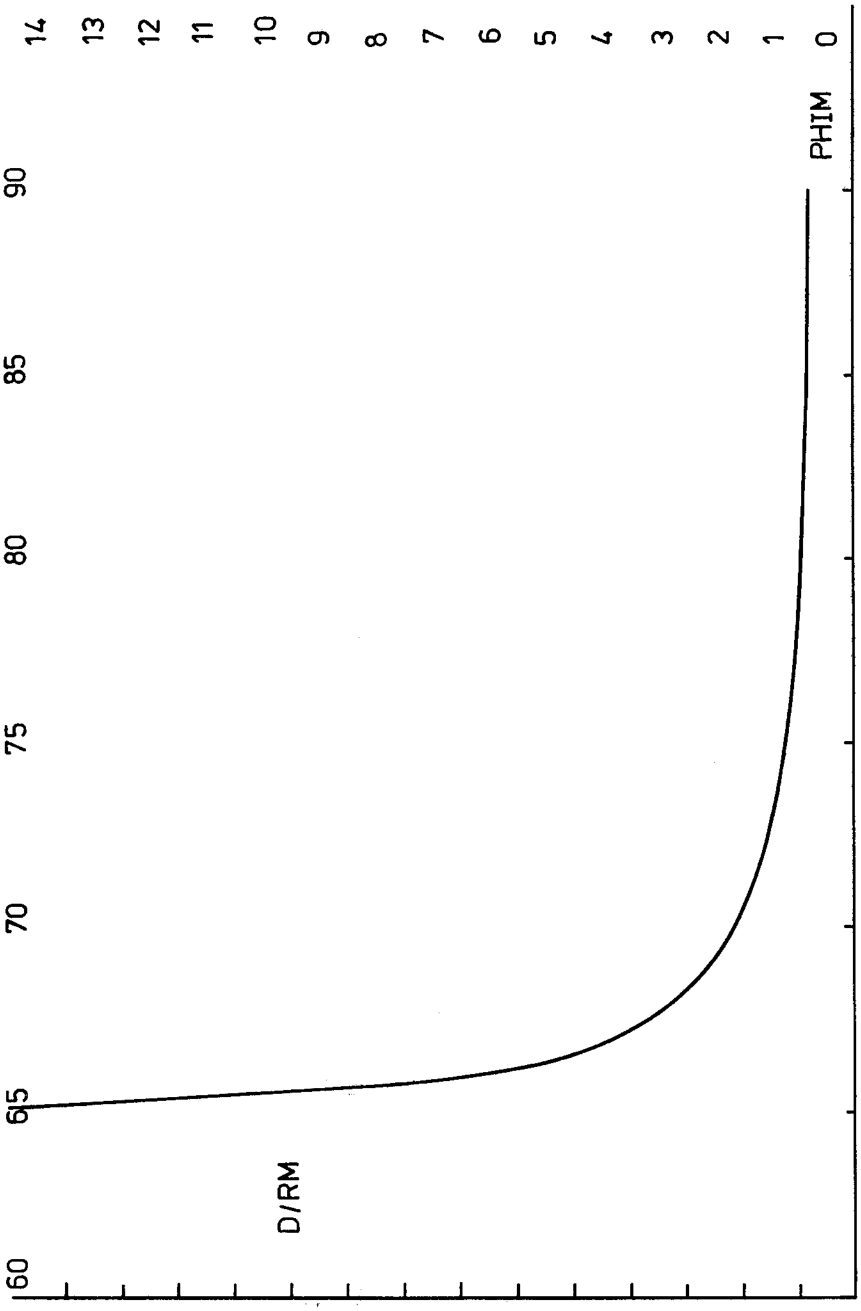
Figure 7:
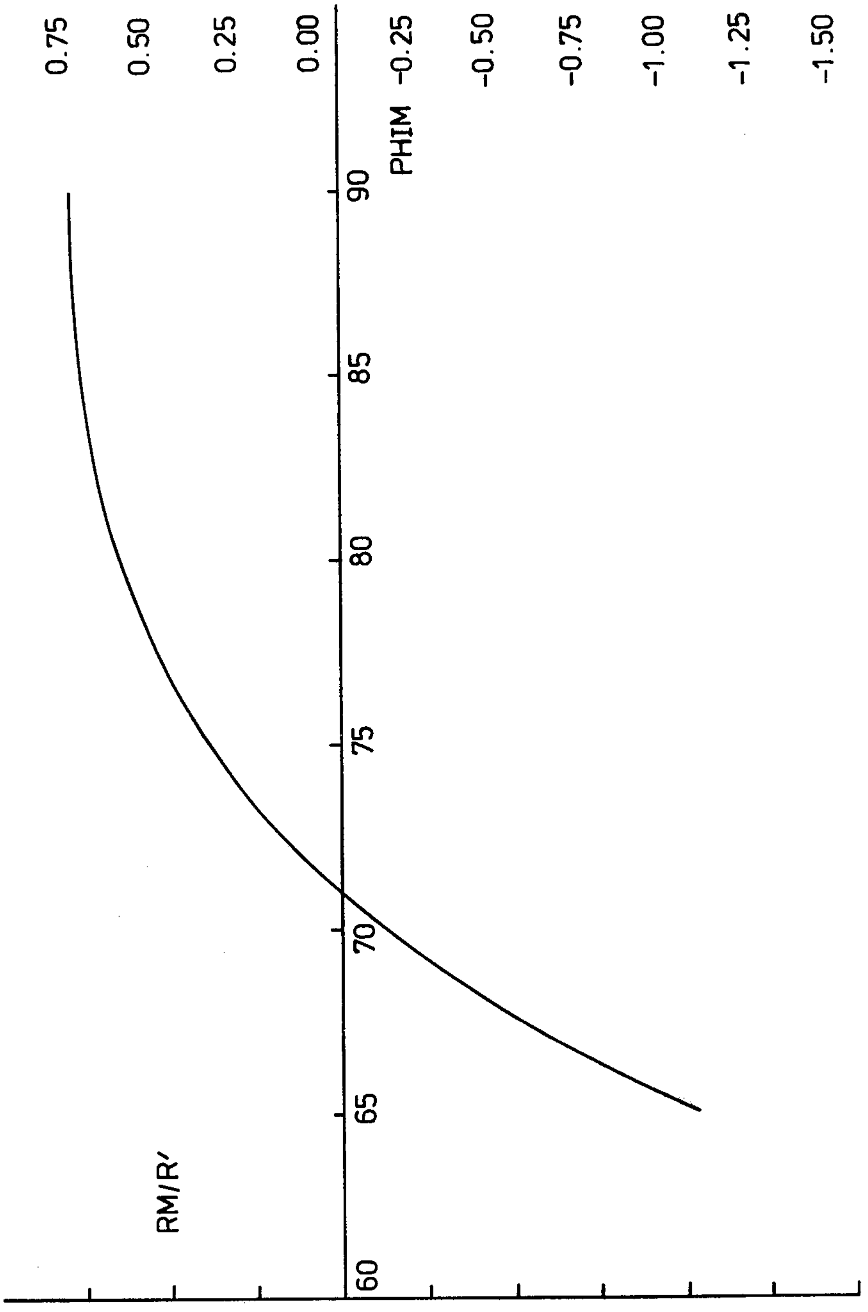

FIG. 2 shows dependence of $\epsilon''$
FIG. 3 shows dependence of $(1'_e/R_e)$
FIG. 4 shows dependence of $(1''_m/R_m)$
FIG. 5 shows dependence of $(R_e/R_m)$
FIG. 6 shows dependence of $(d/R_m)$
FIG. 7 shows dependence of $(R_m/R')$ In the above-mentioned range of possible values of $\phi_m$ the lower limit is critical because, as can be seen from the above, this is the value at which $(R_e/R_m)$ assymptotically approaches infinity corresponding to $\cos \phi_m = 1/6 [\sqrt{13}-1]$. The upper limit of $\phi_m$ is determined by the need to produce a real final image i.e. $1''_m/R_m \geqq 0$.

It can be calculated from the above equations that when $\phi_m$ lies in the range 64.2619° to 90.000° the other parameters lie in the ranges given above.

It is, of course, possible first to select a value of any parameter within the above ranges and from that determined the unique values of the other parameters which must be associated with it.

The parameters so defined will produce a mass spectrometer with a focal point after the magnetic field when the electrostatic field is forward of the magnetic field or a mass spectrometer with a focal point after the electrostatic field when the magnetic field is forward of the electrostatic field. The characteristics of this focus will be that the five aberration coefficients $B_1$, $B_2$, $B_{11}$, $B_{12}$ and $B_{22}$, as defined by H. Hintenberger and L A Konig in Advances in Mass Spectrometry, volume 1, pages 16–35 1959, will all be simultaneously zero.

Additionally, when the electrostatic field is forward of the magnetic field the spectrometers will have spectrograph properties such that there will be a focal plane along the line joining the point focus to the point of entry of the ion beam into the magnetic field. The characteristics of the foci along this focal plane will be that the two coefficients $B_1$ and $B_2$ will be simultaneously zero at all points along this plane, i.e. independent of mass.

It will be clear from the definitions of $1'_e$ and $1''_m$ given above that the ion optical beam may be passed through the spectrometer in either direction, by interchange of the ion source and the detection means, according to the use of which the instrument is to be put, i.e. the reverse geometry may be used only as a spectrometer.

At the higher limit of $\phi_m$ the focal plane of the spectrometer is coincident with the exit face of the magnetic field when the ion-optical beam is passed first through the electrostatic field. This is advantageous when the instrument is used in a mass spectrograph mode since the adverse defocussing effect of the fringe magnetic field on the emergent beam is eliminated. A further advantage arises when the newer types of electronic multichannel plate detectors are used since they function more efficiently when the detector is located in the fringe magnetic field, as this reduces electron loss in the detector.

It will be noted from FIG. 7 that at one value of $\phi_m$, 70.956322°, the parameter $(R_m/R')$ is zero, i.e. the inner face of the magnetic field advantageously is planar.

When the electrostatic field is forward of the magnetic field the beam enters normal to the inner face of the magnetic field, i.e. normal to the entry face of the magnetic field, and this reduces the adverse defocussing effect of the fringe field. Further, since the deflections in the two fields are in the same sense, the detection of metestable ions is improved. In this mode the instrument can be used with an electronic ion detector behind the exit slit, i.e. as a true double focussing mass spectrometer.

We claim:

1. A spectrometer comprising an electrostatic analyser and a magnet producing a radial electrostatic field and a homogeneous magnetic field respectively, so arranged in tandem that an ion optical beam passing through them is normal to the entry and exit boundaries of the electrostatic field and to the inner face of the magnetic field adjacent to the analyser, but non-normal to the outer face of the magnetic field, the deflection of the ion-optical beam in the electrostatic and magnetic fields being in the same sense, characterised in that the parameters $(1'_e/R_e)$, $\phi_e$, $R_e/R_m)$, $d,/R_m\ \epsilon'$, $(R_m/R'')\ \phi_m$, $\epsilon''$ and $(1''_m/R_m)$, have values in the following ranges:

$\phi_m$—64.2619° to 90.000°
$\epsilon'$—zero
$\phi_e$—155.2559° to 159.0990°
$\epsilon''$—−57.8691° to −45.0000°
$(1'_e/R_e)$—0.8558 to 0.7071
$1''_m/R_m$—0.2727 to 0.0000
$(R_eR_m)$—$+\infty$ to 3.6336
$(d/R_m)$—$4.7930 \times 10^5$ to 0.8348
$(R_m/R'$—−1.2222 to 0.7854 wherein the above symbols have the following meanings:

$1'_e$—the distance from the ion source to the entrance to the electrostatic field when the beam passes first through the electrostatic field, or the corresponding field to the aberration-free focal point when the beam passes first through the electromagnet;
$R_e$—the radius of curvature of the mean beam axis in the electrostatic field;
$R_m$—the radius of curvature of the mean beam axis in the magnetic field;
$\phi_e$—the angle of deflection of the beam in the electrostatic field;
$\phi_m$—the angle of deflection of the beam in the magnetic field;
d—the distance separating the electrostatic and magnetic fields along the path of the beam;
$\alpha'$—the angle of the beam to the normal to the inner face of the magnetic field, i.e. zero;
$\alpha''$—the angle of the beam to the normal to the outer face of the magnetic field;
R'—the radius of curvature of the inner face of the magnetic field, and
$1''_m$—the distance from the outer face of the magnetic field to the aberration-free focal point when the beam passes first through the electrostatic analyser, or the corresponding distance from the ion source to the outer face of the magnetic field when the beam passes first through the electromagnet, the parameters being related by following equations 1 to 7:

EQUATION 1.

$$-\sin \phi_m = \sqrt{2} \sin\left(\sqrt{2}\,\phi_e\right)$$

EQUATION 2.

$$\epsilon'' = \frac{\phi_m}{2} - \frac{\pi}{2}$$

$$\frac{1'_e}{R_e} = (\cot^2\phi_m + \tfrac{1}{2})^{\frac{1}{2}}$$ EQUATION 3.

$$\frac{1''_m}{R_m} \sin\phi_m - \tan\left(\frac{\phi_m}{2}\right)$$ EQUATION 4.

EQUATION 5.

$$\frac{R_e}{R_m} = \left[\frac{2\sin^4\left(\frac{\phi_m}{2}\right)\left[16(1-\tfrac{1}{2}\sin^2\phi_m)^{\frac{1}{2}} + 99\sin^2\phi_m - 8(1-\tfrac{1}{2}\sin^2\phi_m)^{\frac{1}{2}}\sin^2\phi_m - 9\sin^4\phi_m + 142\right]}{9\left[3\cos^2\phi_m - 2\sin^2\left(\frac{\phi_m}{2}\right)\right]^2}\right]^{\frac{1}{2}}$$

EQUATION 6

$$\frac{d}{R_m} = \frac{\frac{R_e}{R_m}\sin^2\left(\frac{\phi_m}{2}\right)[24(1-\tfrac{1}{2}\sin^2\phi_m)^{\frac{1}{2}} + 10\sin^2\phi_m + 6] + 3\left(\frac{R_e}{R_m}\right)^2[(1-\tfrac{1}{2}\sin^2\phi_m)^{\frac{1}{2}} + 1]\left[3\cos^2\phi_m - 2\sin^2\left(\frac{\phi_m}{2}\right)\right]}{\sin\phi_m\left[3\frac{R_e}{R_m}\left(3\cos^2\phi_m - 2\sin^2\left(\frac{\phi_m}{2}\right)\right) - 8(1-2(1-\tfrac{1}{2}\sin^2\phi_m)^{\frac{1}{2}})\sin^2\left(\frac{\phi_m}{2}\right)\right]}$$

EQUATION 7

$$\frac{R_m}{R'} = \frac{\sin\phi_m(\sin^2\phi_m - 18)}{6\left(\frac{R_e}{R_m}\right)^2} + 2\left[2 - \cot^2\left(\frac{\phi_m}{2}\right)\right]\cos^2\left(\frac{\phi_m}{2}\right)\cot\left(\frac{\phi_m}{2}\right)$$

2. A spectrometer as claimed in claim 1 in which the parameter $\phi_m$ has the value 90° with a focal plane coincident with the magnet exit boundary when the electrostatic field is forward of the magnetic field.

3. A spectrometer as claimed in claim 1 in which the parameter $\phi_m$ has the value 70.956322° and the magnetic field has planar entrance and exit boundaries.

4. A spectrometer as claimed in claim 1 in which the electrostatic field is forward of the magnetic field.

5. A spectrometer as claimed in claim 4 with an ion detector behind the exit slit.

6. A spectrometer as claimed in claim 1 in which the magnetic field is forward of the electrostatic field, with an ion detector behind the exit slit after the electrostatic field.

7. A spectrograph comprising an electrostatic analyser producing a radial electrostatic field forward of a magnet producing a homogeneous magnetic field so arranged in tandem that an ion optical beam passing through them is normal to the entry and exit boundaries of the electrostatic field and to the inner face of the magnetic field adjacent to the analyser but non-normal to the outer face of the magnetic field, the deflection of the ion-optical beam in the electrostatic and magnetic fields being in the same sense, characterized in that the parameters $1'_e/R_e$, $\phi_e$, $R_e/R_m$, $d/R_m$, $\epsilon'$, $R_m/R'$ $\phi_m$, $\epsilon''$ and $1''_m/R_m$ having values in the following ranges:

$\phi_m$—64.2619° to 90.000°

$\epsilon'$—zero $\phi_e$—155.2559° to 159.0990°

$\epsilon''$—−57.8691° to −45.0000°

$1'_e/R_e$—0.8558 to 0.7071

$1''_m R_m$—0.2727 to 0.0000

$R_e/R_m$—$+\infty$ to 3.6336

$d/R_m$—4.7930 $\times 10^5$ to 0.8348

$R_m/R'$—−1.2222 to 0.7854 wherein the above symbols have the following meanings:

$1'_e$—the distance from the ion source to the entrance to the electrostatic field when the beam passes first through the electrostatic field, or the corresponding field to the aberration-free focal point when the beam passes first through the electromagnet;

$R_e$—the radius of curvature of the mean beam axis in the electrostatic field;

$R_m$—the radius of curvature of the mean beam axis in the magnetic field;

$\phi_e$—the angle of deflection of the beam in the electrostatic field;

$\phi_m$—the angle of deflection of the beam in the magnetic field;

d—the distance separating the electrostatic and magnetic fields along the path of the beam;

$\epsilon'$—the angle of the beam to the normal to the inner face of the magnetic field, i.e. zero;

$\epsilon''$—the angle of the beam to the normal to the outer face of the magnetic field;

R'—the radius of curvature of the inner face of the magnetic field, and $1''_m$—the distance from the outer face of the magnetic field to the aberration-free focal point when the beam passes first through the electrostatic analyser, or the corresponding distance from the ion source to the outer face of the magnetic field when the beam passes first through the electromagnet, the parameters being related by following equations 1 to 7:

$$-\sin\phi_m = \sqrt{2}\sin\left(\sqrt{2}\,\phi_e\right)$$ EQUATION 1.

$$\epsilon'' = \frac{\phi_m}{2} - \frac{\pi}{2}$$ EQUATION 2.

$$\frac{1'_e}{R_e} = (\cot^2\phi_m + \tfrac{1}{2})^{\frac{1}{2}}$$ EQUATION 3.

$$\frac{1''_m}{R_m} \sin\phi_m - \tan\left(\frac{\phi_m}{2}\right)$$ EQUATION 4.

EQUATION 5.

$$\frac{R_e}{R_m} =$$

-continued $$\frac{d}{R_m} = \left[\frac{2\sin^4\left(\frac{\phi_m}{2}\right)\left[16\left(1-\tfrac{1}{2}\sin^2\phi_m\right)^{\frac{1}{2}} + 99\sin^2\phi_m - 8\left(1-\tfrac{1}{2}\sin^2\phi_m\right)^{\frac{1}{2}}\sin^2\phi_m - 9\sin^4\phi_m + 142\right]}{9\left[3\cos^2\phi_m - 2\sin^2\left(\frac{\phi_m}{2}\right)\right]^2}\right]^{\frac{1}{2}}$$

EQUATION 6

-continued $$\frac{\frac{R_e}{R_m}\sin^2\left(\frac{\phi_m}{2}\right)\left[24\left(1-\tfrac{1}{2}\sin^2\phi_m\right)^{\frac{1}{2}} + 10\sin^2\phi_m + 6\right] + 3\left(\frac{R_e}{R_m}\right)^2\left[\left(1-\tfrac{1}{2}\sin^2\phi_m\right)^{\frac{1}{2}} + 1\right]\left[3\cos^2\phi_m - 2\sin^2\left(\frac{\phi_m}{2}\right)\right]}{\sin\phi_m\left[3\frac{R_e}{R_m}\left(3\cos^2\phi_m - 2\sin^2\left(\frac{\phi_m}{2}\right)\right) - 8\left(1 - 2\left(1-\tfrac{1}{2}\sin^2\phi_m\right)^{\frac{1}{2}}\right)\sin^2\left(\frac{\phi_m}{2}\right)\right]}$$

$$\frac{R_m}{R'} = \frac{\sin\phi_m(\sin^2\phi_m - 18)}{6\left(\frac{R_e}{R_m}\right)^2} + 2\left[2 - \cot^2\left(\frac{\phi_m}{2}\right)\right]\cos^2\left(\frac{\phi_m}{2}\right)\cot\left(\frac{\phi_m}{2}\right)$$

EQUATION 7

8. A spectrograph as claimed in claim 7 in which the parameter $\phi_m$ has the value 90° with a focal plane coincident with the magnetic exit boundary.

9. A spectrograph as claimed in claim 7 in which the parameter $\phi_m$ has the value 70.956322° and the magnetic field has planar entrance and exit boundaries.

10. A spectrograph as claimed in claim 7 with a planar ion detector at the focal plane.

* * * * *

UNITED STATES PATENT AND TRADEMARK OFFICE
CERTIFICATE OF CORRECTION

PATENT NO. : 4,307,295
DATED : December 22, 1981
INVENTOR(S) : Michael Barber, et al.

It is certified that error appears in the above—identified patent and that said Letters Patent is hereby corrected as shown below:

Col. 3, line 44, after "use" change "of" to --to--.

Col. 3, line 68, change "metestable" to --metastable--.

Col. 4, line 15, in Claim 1, change

"$(1'_e/R_e)$, $\phi_e$, $R_e/R_m)$, $d,/R_m$ $\varepsilon'$, $(R_m/R'')$ $\phi_m$,$\varepsilon$" to --$\frac{1'_e}{R_e}$, $\phi_e$, $\frac{R_e}{R_m}$, $\frac{d,}{R_m}$ $\varepsilon'$, $\frac{R_m}{R'}$, $\phi_m$, $\varepsilon''$ --.

Col. 4, line 24, in Claim 1, change "$(R_e R_m)$" to --$(R_e/R_m)$--.

Col. 4, line 26, in Claim 1, change "$(R_m/R'$ " to --$(R_m/R')$ --.

Col. 4, lines 45 and 47, change alphas to --epsilons--.

Col. 5, Equation 4, should read: --$\frac{1''_m}{R_m} = \sin \phi_m - \tan(\frac{\phi_m}{2})$ --

Col. 6, line 2, after "$R_m/R'$" insert a comma.

Col. 6, line 10, change "$1''_m R_m$" to $\frac{1''_m}{R_m}$ --.

Col. 6, Equation 4, after "$\frac{1''_m}{R_m}$ " insert an equal sign.

UNITED STATES PATENT AND TRADEMARK OFFICE

CERTIFICATE OF CORRECTION

PATENT NO. : 4,307,295 Page 2 of 2

DATED : December 22, 1981

INVENTOR(S) : Michael Barber, et al.

It is certified that error appears in the above—identified patent and that said Letters Patent is hereby corrected as shown below:

Col. 8, line 24, change "magnetic" to --magnet--.

Signed and Sealed this

***Eighteenth* Day of *May 1982***

[SEAL]

*Attest:*

GERALD J. MOSSINGHOFF

*Attesting Officer* *Commissioner of Patents and Trademarks*

UNITED STATES PATENT AND TRADEMARK OFFICE
CERTIFICATE OF CORRECTION

PATENT NO. : 4,307,295

DATED : December 22, 1981

INVENTOR(S) : Michael Barber, et al.

It is certified that error appears in the above—identified patent and that said Letters Patent is hereby corrected as shown below:

Col. 3, line 44, after "use" change "of" to --to--.

Col. 3, line 68, change "metestable" to --metastable--.

Col. 4, lines 15 and 16, in Claim 1, change

"$(1'_e/R_e)$, $\phi_e$, $R_e/R_m)$, $d,/R_m\ \varepsilon'$, $(R_m/R'')\ \phi_m, \varepsilon$" to --$\frac{1'_e}{R_e}$, $\phi_e$, $\frac{R_e}{R_m}$, $\frac{d}{R_m}$, $\varepsilon'$, $\frac{R_m}{R'}$, $\phi_m$, $\varepsilon''$ --.

Col. 4, line 24, in Claim 1, change "$(R_eR_m)$" to --$(R_e/R_m)$--.

Col. 4, line 26, in Claim 1, change "$(R_m/R'$ " to --$(R_m/R')$ --.

Col. 4, lines 45 and 47, change alphas to --epsilons--.

Col. 5, Equation 4, should read: --$\frac{1//_m}{R_m} = \sin \phi_m - \tan\left(\frac{\phi_m}{2}\right)$ --

Col. 6, line 2, after "$R_m/R'$" insert a comma.

Col. 6, line 10, change "$1''_m R_m$" to $\frac{1''_m}{R_m}$ --.

Col. 6, Equation 4, after "$\frac{1//_m}{R_m}$ " insert an equal sign.

UNITED STATES PATENT AND TRADEMARK OFFICE
CERTIFICATE OF CORRECTION

PATENT NO. : 4,307,295 Page 2 of 2
DATED : December 22, 1981
INVENTOR(S) : Michael Barber, et al.

It is certified that error appears in the above—identified patent and that said Letters Patent is hereby corrected as shown below:

Col. 8, line 24, change "magnetic" to --magnet--.

This Certificate supersedes Certificate of Correction issued May 18, 1982.

Signed and Sealed this

*Twenty-ninth* Day of *June 1982*

[SEAL]

*Attest:*

GERALD J. MOSSINGHOFF

*Attesting Officer* *Commissioner of Patents and Trademarks*